US011339030B2

(12) United States Patent
Álvarez Cuervo et al.

(10) Patent No.: US 11,339,030 B2

(45) Date of Patent: May 24, 2022

(54) RISK-DETECTION SYSTEM FOR A PASSENGER MOVING INSTALLATION

(71) Applicant: TK Elevator Innovation Center S.A., Gijón (ES)

(72) Inventors: Adrián Álvarez Cuervo, Avilés (ES); Marcos Pérez Pérez, Oviedo (ES); José Mendiolagoitia Juliana, Gijón (ES); Isabel Gonzalez Mieres, Gijón (ES); Francisco Javier Sesma Sanchez, Gijón (ES)

(73) Assignee: TK Escalator Norte S.A., Mieres (ES)

( * ) Notice: Subject to any disclaimer, the term of this patent is extended or adjusted under 35 U.S.C. 154(b) by 0 days.

(21) Appl. No.: 17/250,804

(22) PCT Filed: Sep. 2, 2019

(86) PCT No.: PCT/EP2019/073296

§ 371 (c)(1),
(2) Date: Mar. 4, 2021

(87) PCT Pub. No.: WO2020/053004

PCT Pub. Date: Mar. 19, 2020

(65) Prior Publication Data

US 2021/0316963 A1 Oct. 14, 2021

(30) Foreign Application Priority Data

Sep. 10, 2018 (EP) .................................... 18382647

(51) Int. Cl.
*B66B 29/02* (2006.01)
*B66B 25/00* (2006.01)
(Continued)

(52) U.S. Cl.
CPC ............ *B66B 29/005* (2013.01); *B66B 29/02* (2013.01); *G01C 5/00* (2013.01); *G08B 21/02* (2013.01)

(58) Field of Classification Search
None
See application file for complete search history.

(56) References Cited

U.S. PATENT DOCUMENTS 5,782,330 A 7/1998 Mehlert et al.
8,469,175 B2 * 6/2013 Lanzki .................... B66B 25/00 198/322
(Continued)

FOREIGN PATENT DOCUMENTS

CN 204096877 U 1/2015
CN 107665326 A 2/2018
(Continued)

OTHER PUBLICATIONS

Extended European search report, dated Mar. 7, 2019, in European counterpart application No. EP 18382647.8.
(Continued)

*Primary Examiner* — Kavel Singh
(74) *Attorney, Agent, or Firm* — William J. Cassin

(57) ABSTRACT

A passenger moving installation includes a plurality of tread elements forming an endless conveyor belt, wherein the tread elements are at least partially covered by at least one element that limits a transportation height of a user set of the installation. A safety system is configured to detect a risk of collision between the user set and the covering element. A method of determining a risk of collision between a user set and at least one covering element in a passenger moving installation at least partially covered by the covering element, includes determining the height of the user set in a monitoring area via a safety system, comparing the height of the user set to the height of a safety threshold, and triggering
(Continued)

an event in the safety system if the user height exceeds the safety threshold.

8 Claims, 5 Drawing Sheets

(51) Int. Cl.

| | |
|---|---|
| ***B66B 21/02*** | (2006.01) |
| ***B66B 29/00*** | (2006.01) |
| ***G01C 5/00*** | (2006.01) |
| ***G08B 21/02*** | (2006.01) |

(56) References Cited

U.S. PATENT DOCUMENTS

| | | | | |
|---|---|---|---|---|
| 10,059,569 | B2 * | 8/2018 | Fang | B66B 29/005 |
| 10,176,381 | B2 * | 1/2019 | Zhao | B66B 5/0012 |
| 10,427,915 | B2 * | 10/2019 | Gonzalez | F16P 3/142 |
| 2005/0088520 | A1 * | 4/2005 | Wiesinger | B66B 29/005 348/42 |
| 2014/0122018 | A1 * | 5/2014 | Sundholm | B66B 3/006 187/388 |
| 2016/0368734 | A1 | 12/2016 | Zhao et al. | |
| 2018/0029838 | A1 | 2/2018 | Fang et al. | |

FOREIGN PATENT DOCUMENTS

| | | | |
|---|---|---|---|
| CN | 107844741 | A | 3/2018 |
| CN | 107867623 | A | 4/2018 |
| CN | 108455429 | A | 8/2018 |
| EP | 3205618 | A1 | 8/2017 |
| JP | S61128263 | U | 8/1986 |
| JP | 2004-175529 | A | 6/2004 |
| JP | 3612467 | B2 | 1/2005 |
| JP | 2015-222533 | A | 12/2015 |

OTHER PUBLICATIONS

International Search Report and Written Opinion, dated Nov. 11, 2019, in International Application No. PCT/EP2019/073296.

Office Action, dated Jan. 20, 2022, in Chinese counterpart patent application No. CN 201980058751.X.

Office Action, dated Dec. 27, 2021, in Russian counterpart patent application No. RU 2021109674.

* cited by examiner

RISK-DETECTION SYSTEM FOR A PASSENGER MOVING INSTALLATION

CROSS REFERENCE TO RELATED APPLICATIONS

This application is a U.S. National Stage Entry of International Patent Application Serial Number PCT/EP2019/073296, filed Sep. 2, 2019, which claims priority to European Patent Application No. EP 18382647.8, filed Sep. 10, 2018, the entire contents of which are incorporated herein by reference.

FIELD

The present disclosure relates to passenger moving installations such as those used in all manner of large-scale premises, for example, in airports and/or stations in which there is an aim to facilitate safe passenger movement. In particular, the present disclosure relates to a passenger moving installation comprising a plurality of tread elements which form an endless conveyor belt, wherein the plurality of tread elements are at least partially covered by at least one element which limits a transportation height of a user set of the installation. The present disclosure also relates to a method to determine for a passenger moving installation comprising a plurality of tread elements at least partially covered by at least one element, a risk of collision between a user set and said at least one element. The present disclosure also relates to a method for modernizing a passenger moving installation comprising a plurality of tread elements at least partially covered by at least one element.

There is a need to improve passenger risk awareness and thus safety on passenger moving installations.

BRIEF DESCRIPTION OF THE FIGURES

The invention is described in more detail with the help of the figures, wherein it is shown schematically.

DETAILED DESCRIPTION

Figure 1A:
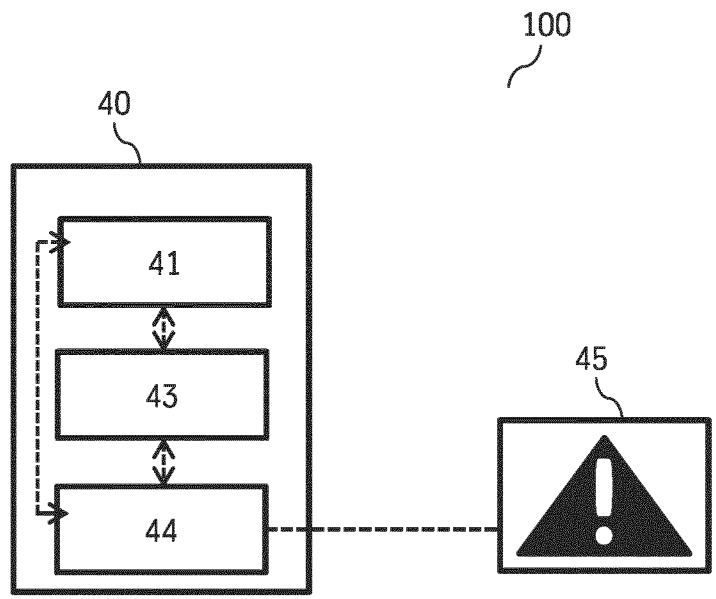
FIG. 1*a* is a schematic process diagram showing an embodiment of the relationship between the safety system and a triggered event, as disclosed herein.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates a passenger moving installation comprising a plurality of tread elements which form an endless conveyor belt, wherein the plurality of tread elements are at least partially covered by at least one element which limits a transportation height of a user set of the installation. The present disclosure further relates to a method for determining a risk of collision between a user set and the at least one covering element.

The term "user set" is to be understood in the context of this invention as meaning the passenger and any item/object of any size that they are carrying on their person, e.g., luggage, sports equipment etc., or using their person via e.g., a trolley to transport such an item/object. The user set can also refer to a passenger of a particular height, wherein said height and the at least one element limits the height of transportation.

The term "element" is to be understood as being the roof above the tread elements/one or more lights/decoration hanging from said roof, etc. It could also be any element in any form in the vicinity above the tread elements of the moving walkway. In the case where a light or a decoration is hanging from the ceiling, the at least one element will be that which is closest to the tread elements of the passenger moving installation.

The term "passenger moving installation" comprises escalators and moving walkways.

The passenger moving installation according to the invention comprises a plurality of tread elements which form an endless conveyor belt, wherein the plurality of tread elements are at least partially covered by at least one element which limits a transportation height of a user set of the installation and a safety system which is adapted to detect if there is a risk of collision between the user set and the at least one element. This risk detection system improves passenger awareness and thus safety.

In an advantageous embodiment, the passenger moving installation is adapted to detect a risk of collision via the safety system. The safety system is preferably positioned in an area above the tread elements of the moving installation. It determines whether the height of the user set reaches or exceeds a safety threshold with respect to a maximum height. The height of the element or the part of the element which is closest to the tread elements of the moving installation represents the maximum height of the safety threshold. Thus the safety threshold is determined by the distance between the at least one element and the tread elements of the moving installation and is preferably chosen with a safety offset with respect to the maximum height. That means the safety threshold equals the maximum height minus the safety offset. The safety offset might be between 0.1% and 10% of the maximum height, preferably between 1% and 2.5% of the maximum height. Preferably, the maximum height depends on the specifics of the installation. For example, in some case the threshold can be fixed whilst in others, it can be an adjustable parameter, adapted to be manipulated by an authorized person, for example, a technician, operator, owner of the installation.

In an advantageous embodiment, the safety system of the passenger moving installation is adapted to trigger an event at a control unit. Preferably the event includes actions such as storing images of user sets for future reference; displaying images in a control room; activating an alarm; activating a light signal. It is envisaged, for example, that once the alarm is activated, the moving installation can be configured to slow down and eventually stop. Preferably, stopping will occur if the height risk has not been removed despite the moving installation slowing down. This provides for the possibility of the user to rectify the height risk his/herself, without causing major interruption to travel on the moving installation. For example, once the detected height reaches or exceeds the safety threshold e.g., a risk of collision between the user set and the at least one element is detected, the event that will be triggered is an alarm. This advantageously provides a means of communication between the passenger moving installation and the passenger when the height of a user set exceeds the safety threshold. The passenger is made aware of the risk so that they can remedy the situation, thus improving safety for all users of the moving installation. The alarm can be visual or audio or a combination of both, for example, the alarm can be a siren, a loud speaker, a signal light, or a combination of both, e.g., a signal light and a siren. Should no risk be detected, the triggered event can be the storing of images of a user set in a databank, which can then be used at a future date as a reference point.

Alternatively, or additionally, the triggered event can be the displaying of images in a control room. This advantageously allows the user set to be monitored throughout the path of travel on the passenger moving installation. It is envisaged that one or several events can be carried out at any one time.

In an advantageous embodiment, the passenger moving installation according to the invention can be further distinguished in that the safety system comprises a monitoring device. The monitoring device is adapted to monitor in a predetermined monitoring area at least the height of the user set.

The monitoring area is the area about the passenger moving installation in which the safety system is adapted to trigger an event, for example, activate an alarm, if there is a risk of collision between the user set and the safety threshold. The monitoring area includes at least the volume of space which the user set occupies. The monitoring area can be an area prior to entering the passenger moving installation, i.e., an area in the immediate vicinity to the front of the entrance to the moving installation; or on the moving installation itself; or both. The passenger moving installation includes up to the entire length of the moving installation as defined by the handrail.

Preferably, the monitoring area includes all areas of and around the moving installation which are used by a user set. For example, the monitoring area includes the volume of space which the user set occupies when in front of the passenger moving installation before mounting occurs. This can include the volume of space when the user set is 3 meters or less from the entrance to the moving passenger installation, preferably when the user set is 2 meters or less from the entrance to the moving passenger installation, more preferably when the user set is 1 meter or less from the entrance to the moving passenger installation. Another example of the monitoring area includes the volume of space occupied by the user set during mounting and traveling on the passenger moving installation. Another example of the monitoring area includes the volume of space which the user set occupies when in front of the passenger moving installation before mounting occurs and the volume of space occupied by the user set during mounting and traveling on the passenger moving installation. This can include the volume of space when the user set is 3 meters or less from the entrance to the moving passenger installation, preferably when the user set is 1 meter or less from the entrance to the moving passenger installation, more preferably when the user set is 0.5 meter or less from the entrance to the moving passenger installation.

In an advantageous embodiment the safety threshold in relation to the passenger moving installation according to the invention, is a predetermined height value which is preferably stored in the safety system. Preferably, the safety system is adapted to compare the height data of the user set with the predetermined height value.

The monitoring device can operate via various means, e.g., at least one sensor; at least one light emitting means, e.g., a laser, light emitting diode; at least one camera or any combination thereof. The input data that the monitoring device receives depends on the means used. For example, when a camera is used, the data input is the images of user(s)/user set(s). This advantageously allows for the height of a user set to be monitored and subsequently measured. Lasers are highly accurate yet expensive means of monitoring; sensors, e.g., motion, heat, light or infra-red, are also accurate means of monitoring and they are cheaper in comparison as well as easier to install and maintain; a camera is also an accurate means of monitoring which is cheaper and easier maintained compared to other devices. All means of monitoring the monitoring area are equally applicable in the invention.

In an advantageous embodiment, the passenger moving installation according to the invention can be further distinguished in that the monitoring device comprises at least one camera. In an advantageous embodiment, the passenger moving installation according to the invention can be further distinguished in that the monitoring device comprises at least one sensor. In an advantageous embodiment, the passenger moving installation according to the invention can be further distinguished in that the monitoring device comprises at least one camera and at least one sensor.

In an advantageous embodiment, the passenger moving installation can be adapted to have at least two modes, an active mode and a sleep mode, wherein the active mode is in operation as soon as the user set enters the monitoring area and remains operational until the user set exits said monitoring area. This advantageously allows for energy saving when the moving installation is not in use. In cases where several user sets are using the passenger moving installation at the same time, the active mode remains in operation from the point in time when the first user set enters the monitoring area until the last user set vacates the monitoring area. The active mode can thus last from a few minutes to several hours. When a user set first enters the monitoring area, the active mode is triggered and the monitoring device is in the "on" configuration. It remains continuously so until no user set remains in the monitoring area.

In an advantageous embodiment, the safety system is preferably positioned in a fixed space on the moving installation. Most preferably, it is positioned such that the monitoring area covers the user set in front of the passenger moving installation before mounting occurs.

In another advantageous embodiment, the safety system is positioned such that the monitoring area covers the user set during mounting and traveling on the moving installation.

In a further advantageous embodiment, the safety system is positioned such that the monitoring area covers the user set in front of the passenger moving installation before mounting occurs and during mounting and traveling on the moving installation. This particular embodiment advantageously provides for monitoring of the user set at all stages of travel on a passenger moving installation and can be achieved using for example, a camera with a 360° lens, a movable lens, a camera, a sensor, or any combination of one or more thereof.

In an advantageous embodiment, the safety device comprises at least one of the following: a height-detection means for determining the height of a user set, preferably in the monitoring area; a control unit for triggering an event, e.g., activating an alarm; a tracking system for tracking the position of the user set, preferably in the monitoring area. Preferably, the safety device comprises a height-detection means for determining the height of a user set, preferably in the monitoring area and a control unit for triggering an event, e.g., activating an alarm.

The safety device can optionally further comprise at least one tracking system for tracking the position of the user set. The tracking system preferably tracks the user set when in the monitoring area and can be adapted to track the movement of the user set throughout their transit on the passenger moving installation.

In an advantageous embodiment, the optional tracking system comprises at least one sensor selected from the group of infra-red, visual, heat, light. This provides a safety system which can be adapted to use several tracking means. Tracking preferably occurs within the monitoring area. The tracking system can be physically distinct from the monitoring device or included in it. If physically distinct, it is preferable to incorporate it at a fixed position where its reach includes the monitoring area.

The height-detection means preferably covers the same monitoring area as the monitoring device. The tracking system can also cover the same monitoring area as the monitoring device and/or the height-detection means. The height-detection means can be distinct from or included in the monitoring device of the safety system, or optionally be distinct from or included in the tracking system. The height-detection means is preferably in communication with at least one of the following of the safety system: the monitoring device; the tracking system; a control unit. When the height of the safety threshold is reached or exceeded, the control unit triggers an event, preferably the event is the sounding of an alarm. The height-detection means can be any computer programmable chip known in the art which can be incorporated into the safety device. It is preferably a chip comprising an algorithm that can be manipulated via computer to take into account the height of the at least one element above the plurality of treads of a moving walking installation and where necessary, the various heights of the at least one element in the event there are several elements at different heights. This advantageously allows the safety system to be programmable according to the exact height of the at least one element of a moving installation.

The control unit is preferably comprised within the safety system. It is also possible to sync the control unit of the safety system with the control unit of the moving installation so that when for example, an alarm is activated due to a detected height risk, preferably via the control unit of the safety system, the control unit of the moving installation is also activated and causes the moving installation to slow down and eventually stop. It is preferred that stopping will only occur if the height risk has not been removed within three minutes of sounding the alarm, preferably within two minutes of sounding the alarm, preferably within one minute of sounding the alarm. This provides for an improvement in user safety of moving installations.

The safety system, in particular the monitoring device and/or the tracking system and/or the height-detection means can be incorporated at several fixed positions along the length of the safety threshold, e.g., along the ceiling space above the tread elements, or attached to a light or a decoration or an object hanging therefrom, or indeed any combination of the above. In the event the height-detection means and/or the tracking system is physically distinct from the monitoring device, the height-detection means and/or the tracking system is preferably mounted to the fixed space which also hosts the monitoring device, or it is mounted externally to the monitoring device itself.

In an advantageous embodiment, the fixed space refers to an area in the vicinity above the passenger moving installation. Preferably, it is an area before the user set mounts the moving installation. Preferably, this is a position above the entrance to the moving installation. In this particular embodiment, the tracking system is preferably incorporated with the monitoring device. More preferably, the height-detection means and optionally the tracking system, is/are incorporated with the monitoring device. This advantageously provides a safety system that can be adapted to monitor certain positions of a user set when about to use a moving installation. It provides that a user set can be monitored before mounting a moving installation and raise any alarm beforehand if necessary.

In another advantageous embodiment, the fixed space refers to an area above the tread elements which is at least partially covered by at least one element. In this particular embodiment, the height-detection means and optionally the tracking system are incorporated into any one or more of at least; the monitoring device, a ceiling space, at least one element, a decoration. This advantageously provides a safety system that can be adapted to monitor a user set throughout the complete use of the moving installation, from pre-mounting, to mounting/traveling and dismounting a moving installation. Should the height of a user set change during travel, for example, a passenger shifts luggage to a different arm or transfers it to a different person, an event can occur to warn of the height restriction, e.g., an alarm can be raised.

In an advantageous embodiment, the fixed space refers to a position above the entrance to the moving installation preferably an area before the user set mounts the moving installation, and an area above the tread elements which is at least partially covered by at least one element.

In an advantageous embodiment, the safety system comprises a height-detection means, a tracking system and a monitoring device. This is particularly advantageous because in the event the monitoring device fails, the tracking system will still be operational and be able to trigger an event at the control unit, e.g., alert the user/passenger to any height risks, and vice versa. Thus, passenger safety is significantly improved.

In an advantageous embodiment, the safety threshold is comprised of at least one sensor which forms a detection beam or area, wherein the height of the threshold is defined by the position of the at least one sensor. This advantageously provides for a safety threshold whose height can be adjusted according to requirements of the moving installation, and wherein the height remains constant throughout. Preferably this sensor can act as a monitoring device, a tracking device, a height-detection means, or any combination thereof.

In another aspect of the invention, there is also provided a method to determine for a passenger moving installation comprising a plurality of tread elements at least partially covered by at least one element, a risk of collision between a user set and said at least one element, said method comprising the following steps:

a) determining the relevant height data of the user set in a monitoring area via a safety system;
b) comparing the height data of the user set in the monitoring area with the height of a safety threshold;
c) triggering an event at the safety system, preferably, activating an alarm if the height of the user set reaches or exceeds the safety threshold.

In another aspect of the invention, there is also provided a method for modernizing a passenger moving installation comprising a plurality of tread elements at least partially covered by at least one element wherein a safety system is provided which is adapted to detect if there is a risk of collision between a user set and the at least one element, wherein the safety system comprises a monitoring device wherein the monitoring device is adapted to monitor in a predetermined monitoring area such that the predetermined monitoring area includes the user set:

a) in front of the passenger moving installation before mounting occurs; or
b) during mounting and traveling on the passenger moving installation; or
c) in front of the passenger moving installation before mounting occurs and during mounting and traveling on the passenger moving installation.

This advantageously allows for an existing passenger moving installation to be upgraded in relation to user safety thanks to the introduction of a safety system which is adapted to detect if there is a risk of collision between the user set and at least one element preferably positioned above the moving installation.

In an advantageous embodiment of this particular aspect of the invention, the safety system further comprises at least one of the following: a tracking system for tracking the position of the user set within the monitoring area, a height-detection means. Preferably, the monitoring device and the tracking system, or the monitoring device and the height-detection means, or the monitoring device, the height-detection means and the tracking system are positioned in the same fixed space.

FIG. 1*a* is a process diagram 100 showing a safety system 40 of a passenger moving installation according to an embodiment of the invention. In this example, the event 45 that is triggered is an alarm. The safety system 40 comprises a monitoring device 41, a height-detection means 43 and a control unit 44. The monitoring device 41 is connected with the height-detection means 43 and the control unit 44. The height-detection means 43 is connected with the monitoring device 41 and the control unit 44. The control unit 44 is connected with each component part, the monitoring device 41, the height-detection means 43 as well as the alarm 45. The dashed lines and arrows represent the direction in which signals for example, information signals, can be sent and/or received by each respective part, i.e., the monitoring device 41, the height-detection means 43 the control unit 44 and the alarm 45. Once a risk of collision is detected, the control unit 44 triggers the alarm 45. The alarm is audio, visual or both.

Figure 1B:
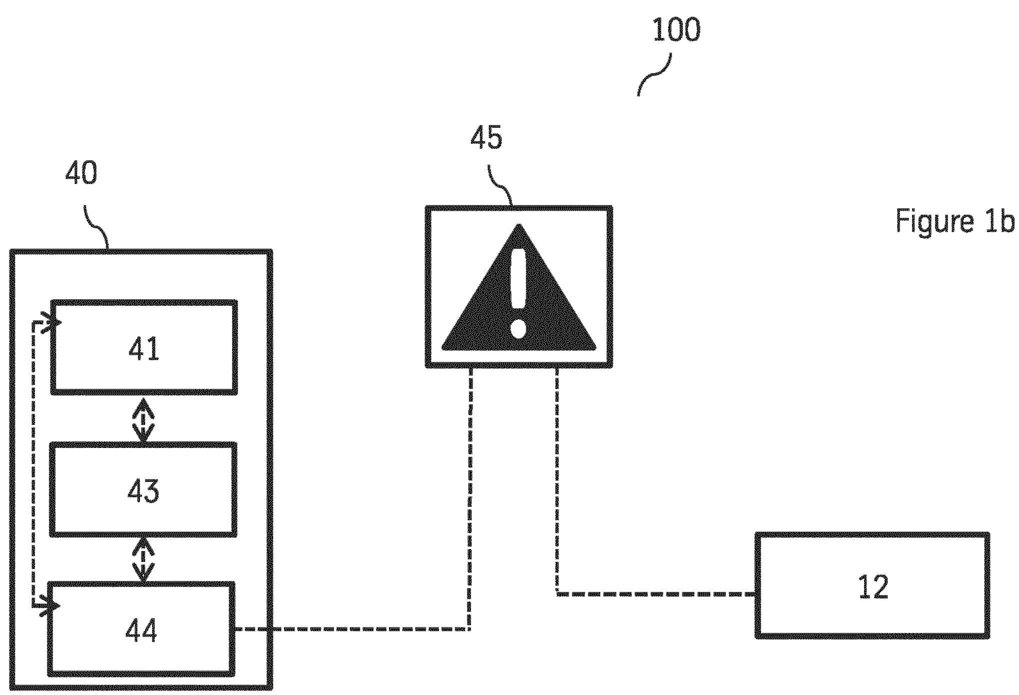
FIG. 1*b* is a schematic process diagram showing an embodiment of the relationship between the safety system and the control unit of the passenger moving installation, as disclosed herein.

FIG. 1*b* shows the same set-up as in FIG. 1*a* with the exception that the alarm 45 is connected to both the control unit 44 of the safety system 40, as well as to a control unit 12 of the passenger moving installation. In this situation, once the height-detection means 43 detects a risk of collision, the control unit 44 triggers the alarm 45. The activated alarm 45 triggers a signal to the control unit 12 of the passenger moving installation which causes the tread elements 11 of the moving installation to slow down and eventually stop.

Figure 1C:
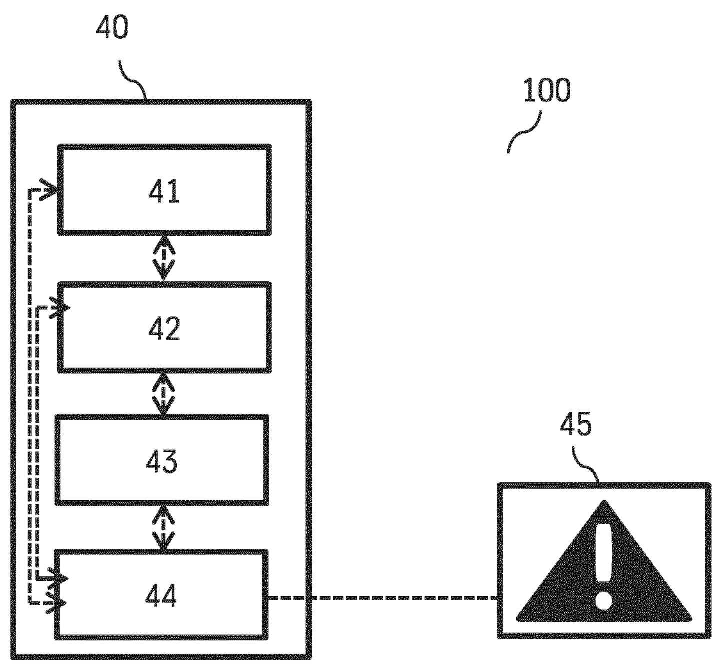
FIG. 1*c* is a schematic process diagram showing an embodiment of the relationship between the safety system comprising a tracking system and a triggered event, as disclosed herein.

FIG. 1*c* is a process diagram 100 showing a safety device 40 of a passenger moving installation according to another embodiment of the invention. In this example, the event 45 that is triggered is an alarm. The safety system 40 comprises a monitoring device 41, a tracking system 42, a height-detection means 43 and a control unit 44. The monitoring device 41 is connected with the height-detection means 43 via the tracking system 42, and the control unit 44. The tracking system 42 is connected with the monitoring device 41, the height-detection means 43 and the control unit 44. The height-detection means 43 is connected with the monitoring device 41 via the tracking system 42, and the control unit 44. It is also envisaged that the monitoring device 41 is connected to the height-detection means 43 via a direct connection rather than via the tracking system 42. The control unit 44 is connected with each component part, the monitoring device 41, the tracking system 42 and the height-detection means 43. The dashed lines and arrows represent the direction in which signals, for example information signals, can be sent and/or received by each respective part, i.e., the monitoring device 41, the tracking system 42, the height-detection means 43 the control unit 44 and the alarm 45. Once a risk of collision is detected, the control unit 44 activates the alarm 45. The alarm is audio, visual or both.

Figure 1D:
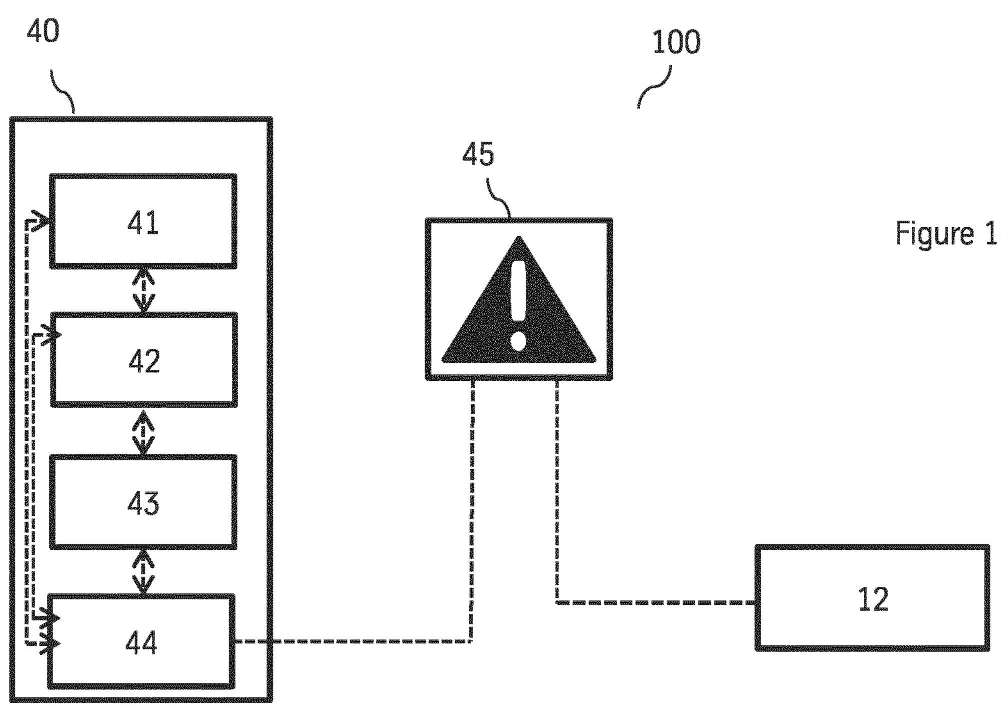
FIG. 1*d* a schematic process diagram showing an embodiment of the relationship between the safety system comprising a tracking system and the control unit of the passenger moving installation, as disclosed herein.

FIG. 1*d* shows the same set-up as in FIG. 1*c* with the exception that the alarm 45 is connected to both the control unit 44 of the safety system 40, as well as to a control unit 12 of the passenger moving installation. In this situation, once the height-detection means 43 detects a risk of collision, the control unit 44 triggers the alarm 45. The activated alarm 45 triggers a signal to the control unit 12 of the passenger moving installation which causes the tread elements 11 of the moving installation to slow down and eventually stop.

Figure 2:
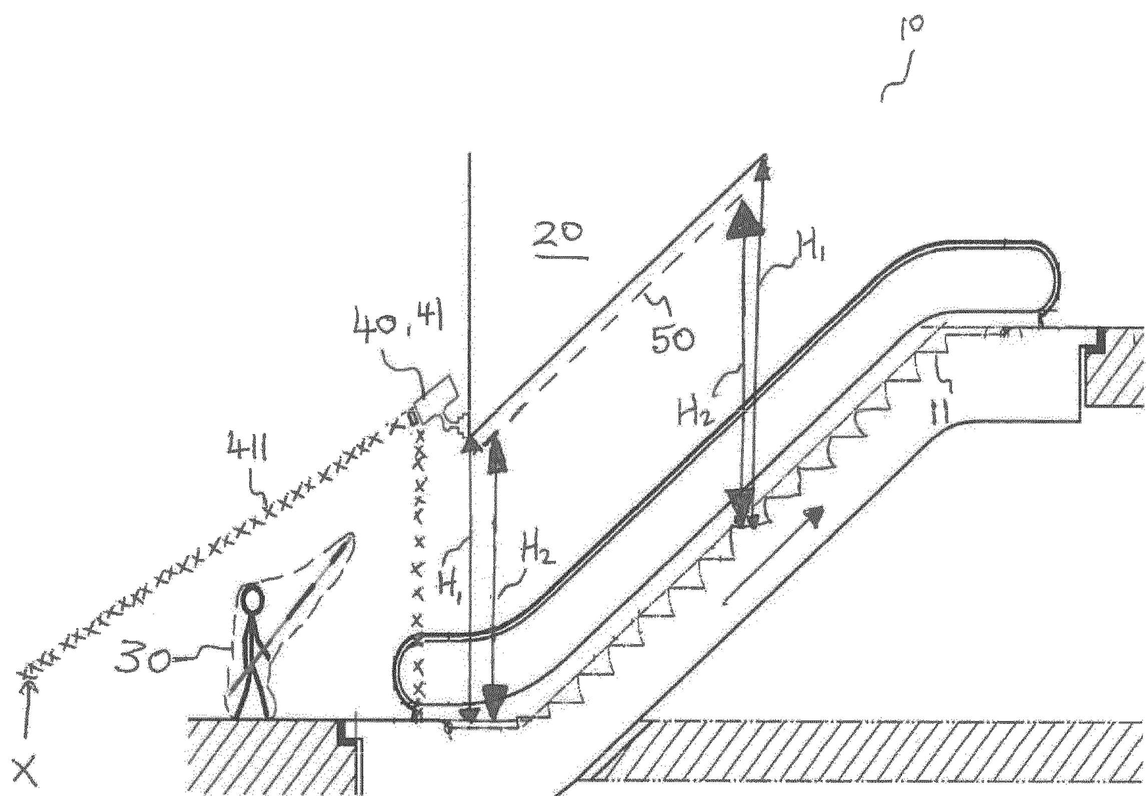
FIG. 2 is a schematic side view of an embodiment of a passenger moving installation of the present disclosure.

FIG. 2 shows an escalator as passenger moving installation 10 according to an advantageous embodiment of the invention. The escalator 10 comprises a plurality of tread elements 11 which are shown by the arrow as moving in an upward direction. It is also envisaged that the tread elements can move in a downward direction or along a horizontal position. Indeed it is envisaged that the tread elements 11 can be adapted to move along any angle within safety regulations or requirements.

The tread elements 11 of the escalator 10 are covered by a ceiling 20. The escalator 10 comprises a safety system 40 positioned above the beginning of the tread elements 11, wherein said safety system 40 comprises a monitoring device 41. The safety system 40 also comprises a height-detection means (not shown) a control unit 44 and an alarm 45, however, they are not shown here. It could optionally comprise a tracking system 42. It is envisaged that these components are comprised within the same fixed space, preferably the same housing as the monitoring device 41 of the safety system 40. The monitoring device 41 in this example is a camera.

Prior to the escalator 10 being set in operation, the safety system 40 is programmed according to the requirements of the escalator 10, for example, the safety threshold 50 height data is recorded and stored via computer (not shown). Once stored and the escalator 10 is in operation, the safety system 40 via the camera 41 constantly monitors the height of any user set 30 as it enters and travels through the monitoring area 411 towards the escalator 10. The user set 30 enters the monitoring area 411 at point “X”.

Two different heights are shown in this figure; $H_1$ refers to the height from the bottom of the tread elements 11 to the ceiling 20 directly above. $H_2$ refers to the height from the bottom of the tread elements 11 to the safety threshold 50. When the user set 30 is in the monitoring area 411, i.e. the volume of space which the user set occupies when in front of the passenger moving installation before mounting occurs, and the height-detection means detects the height of the user set 30 to be the same as or exceed the safety threshold 50, i.e., $H_2$, and thereby exceeds $H_1$, the control unit (not shown) triggers an event 45 (not shown) The event 45 is preferably the sounding of an alarm which may be a siren or warning light, or both to alert the user to the height risk. In this way, the user is made aware of the height risk before stepping onto the tread elements 11 of the escalator 10.

The safety system 40 is positioned in a fixed space above and to the fore of the tread elements 11, i.e., above the entrance to the escalator 10, such that a monitoring area 411 covers a user set 30 before the user set 30 mounts the escalator 10. It is secured in the fixed space using any means appropriate, e.g., screws or a strong adhesive or a combination thereof.

It is also envisaged in this embodiment that the safety system 40 can be synced with the control unit of the escalator 12 (not shown). In particular it is envisaged that the control unit 44 of the safety system 40 can be in connection with the control unit of the escalator 12 (as shown in FIG. 1*b*). This connection would enable the escalator 10 to slow down and eventually stop in the event of a height risk.

Figure 3:
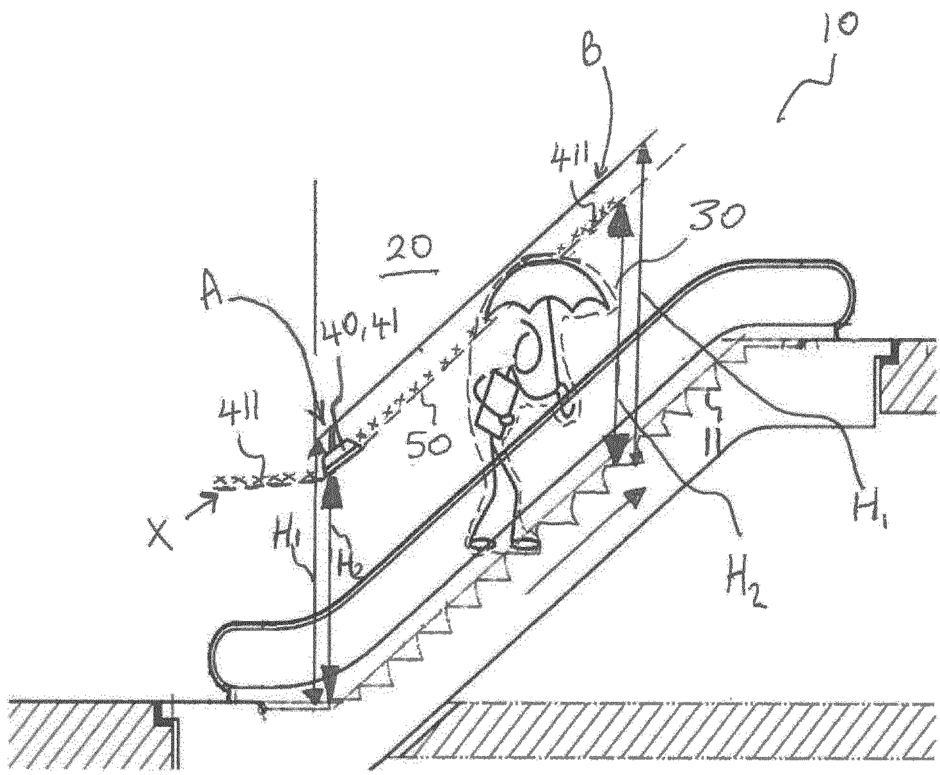
FIG. 3 is a schematic side view of an alternate embodiment of a passenger moving installation of the present disclosure.

FIG. 3 shows an escalator as passenger moving installation 10 according to another advantageous embodiment of the invention. The escalator 10 of this embodiment is similar to the escalator shown in FIG. 2. The monitoring device 41 of the safety system 40 is a sensor, instead of a camera. The sensor 41 is positioned in a fixed space directly above the beginning of the tread elements 11. The sensor 41, in particular an infra-red sensor, projects a beam of energy, or an area of energy, or a plane of energy parallel to the moving direction of the tread elements 11. In this example, the sensor projects a beam of energy. The level the beam is projected at demarcates the height of the safety threshold 50, i.e. $H_2$. The length of the beam demarcates the monitoring area 411. It is also envisaged that the sensor 41 projects a shorter-range beam in the opposite direction so that the area from the beginning of the escalator to the tread elements is covered and thus demarcated as a monitoring area 411 also. The user set 30 enters the monitoring area 411 at point “X”. Thus the risk of collision can be detected before the user set 30 begins to ascend the escalator and/or during travel on the escalator.

In this embodiment, no input of height data is required. A user set 30 with a height equal to or greater than the safety threshold 50 ($H_2$) will interfere with the infra-red beam of the sensor 41 in the monitoring area 411 and thus trigger an event 45 (not shown) at the control unit 44 (not shown). In this example, the event 45 is the sounding of an alarm. Thus, the sensor 41 provides the collective advantages of a monitoring device, and a height-detection means.

It is also envisaged in this embodiment that more than one sensor 41 above the tread elements 11 can be used. This is useful in cases where a sensor 41 can provide only a short range beam of energy, thus in order to ensure an uninterrupted safety threshold 50 along the direction of travel of the tread elements 11, several sensors can be used.

A camera as a monitoring device 41 can also be used in this embodiment. A camera at position A directed in the moving position of the tread elements would provide the same monitoring area 411 and safety threshold 50 as that of the sensor beam. Similarly, a first camera at position A directed in the moving position of the tread elements and a second camera at position B directed in a position opposite to the moving direction of the tread elements 11, i.e., towards camera A, would provide the same monitoring area 411 and safety threshold 50 as that of the sensor beam.

It is also envisaged in this embodiment that the safety system 40 can be synced with the control unit of the escalator 12 (as shown in FIGS. 1*b* and/or 1*d*). This connection would enable the escalator to slow down and eventually stop in the event of a height risk.

Figure 4:
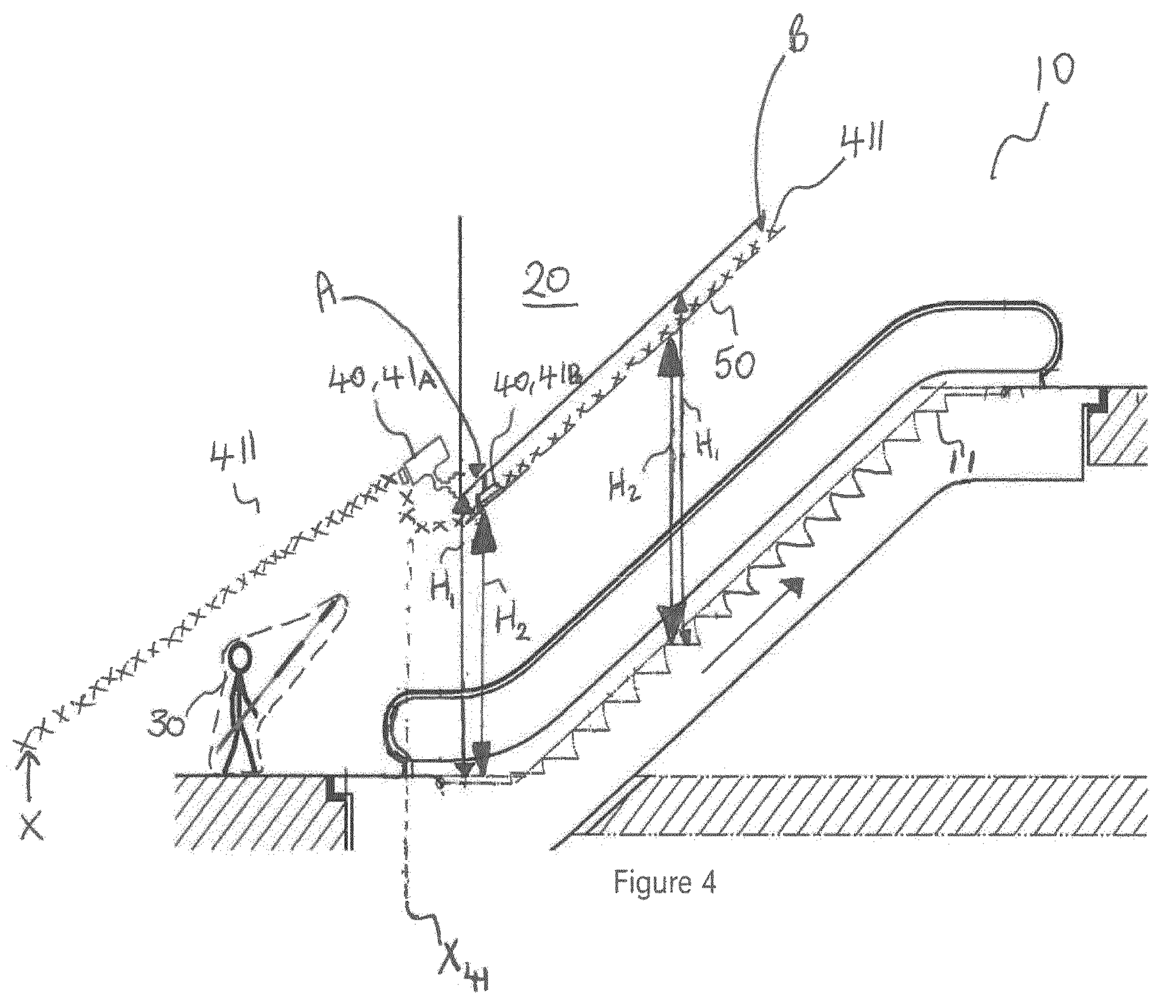
FIG. 4 is a schematic side view of another alternate embodiment of a passenger moving installation of the present disclosure.

FIG. 4 shows an escalator 10 according to an advantageous embodiment of the invention. The escalator 10 comprises a plurality of tread elements 11 which are shown by the arrow as moving in an upward direction. It is also envisaged that the tread elements can move in a downward direction or along a horizontal position. Indeed it is envisaged that the tread elements 11 can be adapted to move along any angle within safety regulations or requirements.

The tread elements 11 of the escalator 10 are covered by a ceiling 20. The escalator 10 comprises a safety system 40 positioned about the ceiling 20 at the beginning of the tread elements 11. The safety system 40 comprises a first monitoring device $\mathbf{41}_A$ and a second monitoring device $\mathbf{41}_B$. The safety system 40 also comprises a height-detection means and a control unit, however these are not shown.

The first monitoring device $\mathbf{41}_A$ of the safety system 40 is a camera and the second monitoring device $\mathbf{41}_B$ of the safety system 40 is a sensor. The camera $\mathbf{41}_A$ is positioned in the same fixed space as the camera shown in FIG. 2, i.e., above and to the fore of the tread elements 11, (above the entrance to the escalator 10), such that a monitoring area 411 covers a user set 30 before the user set 30 mounts the escalator 10. The sensor $\mathbf{41}_B$ is positioned in the same fixed space as the sensor shown in FIG. 3, i.e., directly above the beginning of the tread elements 11. The sensor $\mathbf{41}_B$ is in particular an infra-red sensor, and projects a beam of energy parallel to the moving direction of the tread elements 11. The level the beam is projected at demarcates the height of the safety threshold 50, i.e., $H_2$, whilst the height of the ceiling 20 above the tread elements 11 is $H_1$. The length of the beam demarcates the monitoring area 411. As shown in FIG. 3, the sensor $\mathbf{41}_B$ also projects a shorter-range beam in the opposite direction so that the area at the beginning of the escalator, i.e., the beginning of the handrail, to the tread elements 11 is covered. The combination of the camera $\mathbf{41}_A$ and the sensor $\mathbf{41}_B$ as monitoring devices provides for an uninterrupted monitoring area 411 that covers a user set 30 from before the user set 30 mounts the escalator 10 to the point where the user set 30 can travel on the escalator 10 no further. Consequently, the risk of collision can be detected throughout this whole monitoring area, which is considerably larger than the monitoring area 411 shown in FIGS. 2 and 3. There can be an overlap of the monitoring area 411 that is covered by the camera $\mathbf{41}_A$ and sensor $\mathbf{41}_B$. However, in such a case, the height of the safety threshold 50 remains the same and if the user set 30 exceeds said height, the control unit can trigger an event (not shown) via either the camera $41_A$ or the sensor $41_B$ or both simultaneously.

The monitoring area 411 begins at point "X" and is covered by the camera $41_A$ until point $X_{41}$. From point $X_{41}$ to the end of the monitoring area 411, the monitoring area 411 is covered by the sensor $41_B$.

Prior to the escalator 10 being set in operation, the safety system 40 is programmed according to the requirements of the escalator 10. The safety threshold 50 height data ($H_2$) is recorded and stored via computer (not shown). Once stored and the escalator 10 is in operation, the safety system 40 via the camera $41_A$ constantly monitors the height of any user set 30 as it enters monitoring area 411 at point "X" and continues to monitor the height of any user set 30 until point $X_{41}$.

If the user set 30 is in the monitoring area 411 between points X and $X_{41}$, and the height-detection means (not shown) detects the height of the user set 30 to be the same as or exceed the safety threshold 50, i.e., $H_2$, or is the same as or exceeds $H_1$, the control unit (not shown) will trigger an event 45, for example, an alarm (not shown).

If the user set 30 has traveled through the monitoring area 411 covered by camera $41_A$ without causing a height risk, but their circumstances have changed since entering the monitoring area 411 covered by sensor $41_B$, for example, the user has switched a piece of luggage from one arm to another or has taken an item out of a suitcase, wherein said new circumstances lead to the user set 30 having a height equal to or greater than the safety threshold 50 ($H_2$), the user set 30 will interfere with the beam of the sensor $41_B$ and thus cause the control unit (not shown) to trigger the alarm (not shown). The sensor $41_B$ provides the collective advantages of a monitoring device, tracking system and height-detection means. This is particularly advantageous because in the event the camera $41_A$ fails to operate or is faulty, the sensor $41_B$ remains in operation (or vice versa) and thus, the safety system 40 is still able to alert a user/passenger should a risk of collision be posed.

It is also envisaged that more than one sensor $41_B$ above the tread elements 11 can be used. This is useful in cases where the sensor provides only a short range beam of energy. Thus in order to ensure an uninterrupted safety threshold 50 along the direction of travel of the tread elements 11, several sensors can be used.

Instead of sensors, it is also possible to carry out this embodiment with a camera at position A directed in the moving position of the tread elements. This would provide the same monitoring area 411 and safety threshold 50 as that of the sensor beam. Similarly, a first camera at position A directed in the moving position of the tread elements 11 and a second camera at position B directed in a position opposite to the moving direction of the tread elements 11 i.e., towards camera A, would provide the same monitoring area 411 and safety threshold 50 as that of the sensor beam. Indeed any combination of sensors, light-emitting means and cameras can be incorporated into the safety system 40.

It is also envisaged in this embodiment that the safety system 40 can be synced with the control unit of the escalator 12 (as shown in FIGS. 1*b* and/or 1*d*). This connection would enable the escalator to slow down and eventually stop in the event of a height risk.

Figure 5:
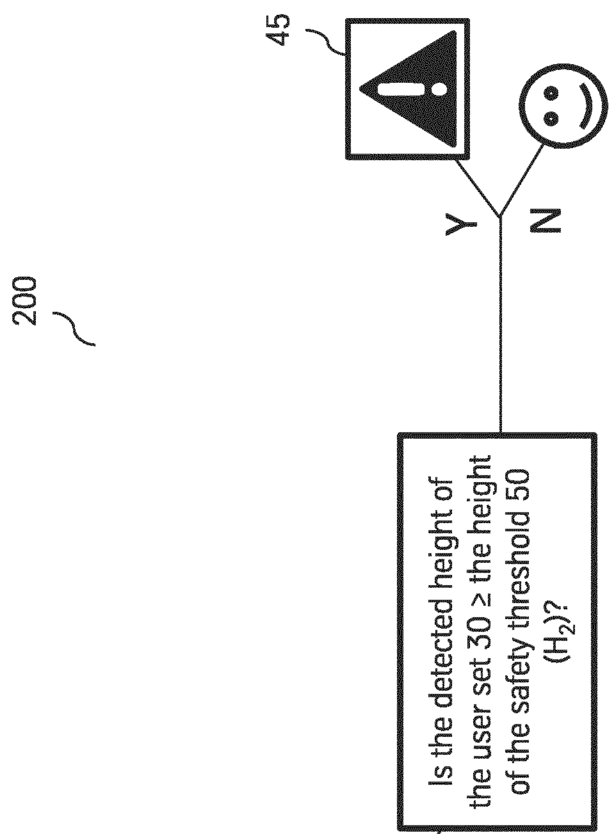
FIG. 5 is a flow chart showing an embodiment of the different scenarios and outcomes foreseen with a passenger moving installation of the present disclosure.

FIG. 5 is a flow diagram explaining the process behind when the safety system 40, in particular, the control unit 44 triggers an event 45. When a user set 30 approaches the passenger moving installation (not shown), the safety system (not shown) will determine whether a risk of collision is posed or not. This is achieved by determining whether the detected height of the user set 30 is greater than the height of the element 20 ($H_1$). If the detected height of the user set 30 is greater than the height of the safety threshold 50 ($H_2$), an event 45 is triggered by the control unit (not shown) of the safety system. If the height of the user set 30 is less than the height of the safety threshold 50 ($H_2$), then no risk is posed, and the user set is able to travel without incident on the passenger moving installation.

The above embodiments are examples of how the invention can be implemented. Parts of one embodiment may be combined with parts of another embodiment without departing from the overall scope of the invention.

REFERENCE SIGNS LIST

10 passenger moving installation
11 tread elements
12 control unit of passenger moving installation
20 element
30 user set
40 safety system
41 monitoring device
$41_A$ first monitoring device
$41_B$ second monitoring device
411 monitoring area
42 tracking system
43 height-detection means
44 control unit
45 event
50 safety threshold
100 process diagram
200 flow chart
$H_1$ height from tread elements 11 to element 20
$H_2$ height from tread elements 11 to safety threshold 50
X beginning of monitoring area 411
$X_{41}$ end of monitoring area 411 covered by monitoring device $41_A$/start of monitoring area 411 by monitoring device $41_B$

What is claimed is:

1. A passenger moving installation, comprising:

a plurality of tread elements, connected together to form an endless conveyor belt;

at least one element disposed above and at least partially covering said plurality of tread elements that limits a transportation height of a user set on said tread elements; and a safety system having a monitoring device configured to detect a height of the user set in a predetermined monitoring area through which the user set must pass prior to boarding the endless conveyor belt, said safety system configured to, detect, prior to the user set boarding the endless conveyor belt, the presence of a risk of collision between the user set and the at least one element upon a determination that the detected height of the user set is equal to or greater than a safety threshold, which safety threshold is a predetermined height value electronically stored in the safety system and generated as a function of a maximum height between the tread elements and the at least one element partially covering the tread elements, and compare the detected height of the user set to the predetermined height value of the safety threshold.

2. The passenger moving installation of claim 1, wherein the safety system is configured to trigger an event when the detected height of the user set is equal to or greater than the safety threshold.

3. The passenger moving installation of claim 1, wherein the monitoring device comprises at least one of a sensor, a light-emitting means, or a camera.

4. The passenger moving installation of claim 1, wherein the monitoring area monitored by the safety system includes an area in which a user set is boarding and travelling on the endless conveyor belt.

5. The passenger moving installation of claim 1, wherein the monitoring area monitored by the safety system includes an area in which a user set is located before boarding the endless conveyor, and an area in which a user set is boarding and travelling on the endless conveyor belt.

6. The passenger moving installation of claim 1, wherein the safety system further comprises a height-detection means configured to determine the height of a user set.

7. The passenger moving installation of claim 1, wherein the safety system includes at least one sensor having at least one of a detection beam or detection area, wherein the height of the safety threshold is defined by the position of the at least one sensor.

8. A method of determining a risk of collision between a user set and at least one element that at least partially covers a plurality of tread elements in a passenger moving installation, for the user set having a height that is equal to or greater than a a safety threshold height, the method comprising:

determining, via a safety system, the height of the user set in a monitoring area;

generating the safety threshold height as a function of a maximum height between the tread elements and the at least one element partially covering the tread elements;

comparing the determined height of the user set in the monitoring area to a height of a safety threshold to identify that the determined height of the user set is equal to or greater than the height of the safety threshold; and triggering an event in the safety system in response to the determined height of the user set being equal to or greater than the safety threshold height.

* * * * *